3,500,204
EQUIVALENT CIRCUIT DETERMINATION BY PULSE REFLECTOMETRY WITH COMPENSATION FOR PARTICULAR IMPEDANCES
Edgar Georg Stromer, Mannedorf, Zurich, Switzerland, assignor to SCM Corporation, a corporation of New York
Filed Oct. 13, 1966, Ser. No. 586,543
Int. Cl. G01r 27/04
U.S. Cl. 324—158   14 Claims

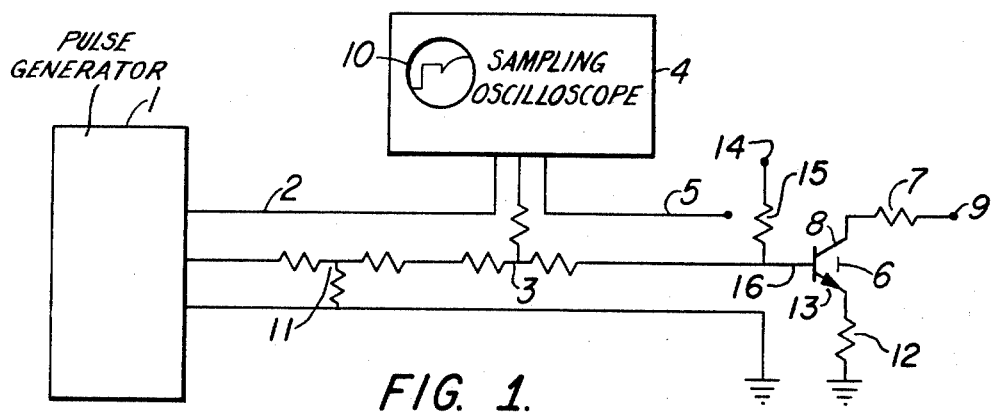
FIG. 1.
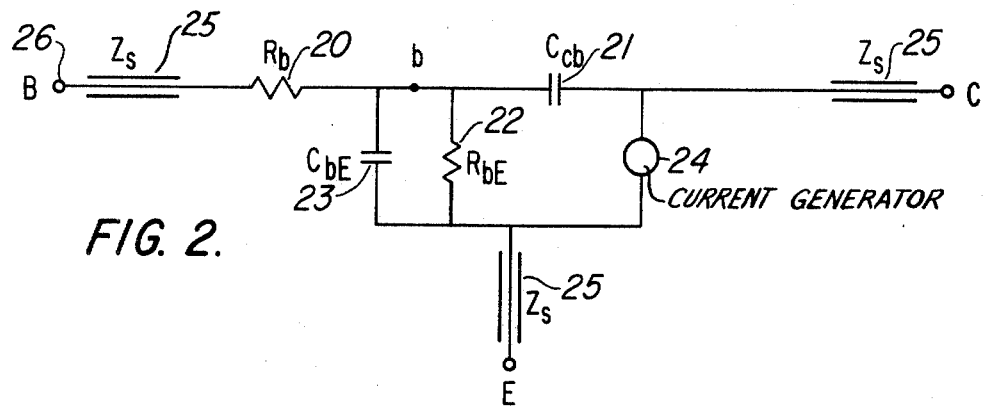
FIG. 2.
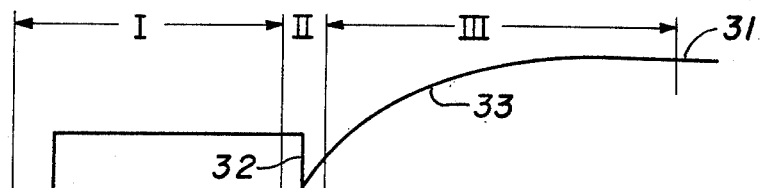
FIG. 3.
INVENTOR
EDGAR GEORG STROMER
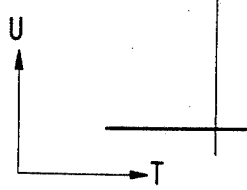
BY
AGENT United States Patent Office 3,500,204
Patented Mar. 10, 1970

ABSTRACT OF THE DISCLOSURE

A reflectometric method for determination of values for individual elements of Giacoletto's small signal model of the equivalent circuit of a transistor is disclosed. The method requires a series of measurements with the transistor terminating different transmission lines having particular impedances. From the measurements there are established the base spreading resistance, $\beta$ cut-off frequency, collector-base depletion capacitance, and (after separate, non-reflectometric determination of the base-emitter resistance), the base-emitter capacitance in Giacoletto's model.

---

This invention relates to determination of the equivalent circuit of an active device by means of time domain reflectometry and, more particularly, to determination of the equivalent circuit of a transistor by this method.

Pulse reflectometry has been used for many years for locating and identifying imperfections and defects in power and coaxial transmission lines. In such uses, it is related to radar in that it is one-dimensional, closed-loop pulse reflection, distance-measuring technique. Application of the technique to the measurement of lumped impedances as terminations of coaxial lines rather than to measurement of distances has been reported (B. M. Oliver in the Hewlett-Packard Journal, vol. 15, No. 6, February 1964, published by the Hewlett-Packard Company in the U.S.A.).

Pulse reflectometry has never been applied to the measurement of the parameters of active devices such as transistors. Transistor equivalent circuit values have been determined heretofore by conventional UHF-bridge measuremnts with attendant complexity of test setup and in the interpretation of the results. The bridge technique is also sensitive to stray impedances within the test object and to mismatches and imperfections in the cabling. As a comparison, in the conventional technique for establishing all the elements of a broadband high-frequency equivalent circuit, six to seven measurements are required (Richard B. Hurley, "Junction Transistor Electronics," pp. 246–247, John Wiley and Sons, 1958). On the other hand, the time domain pulse reflectometry method disclosed requires making only four measurements, together with independent measurement of the small signal short circuit common emitter current gain, $\beta_0$.

Figure 4:
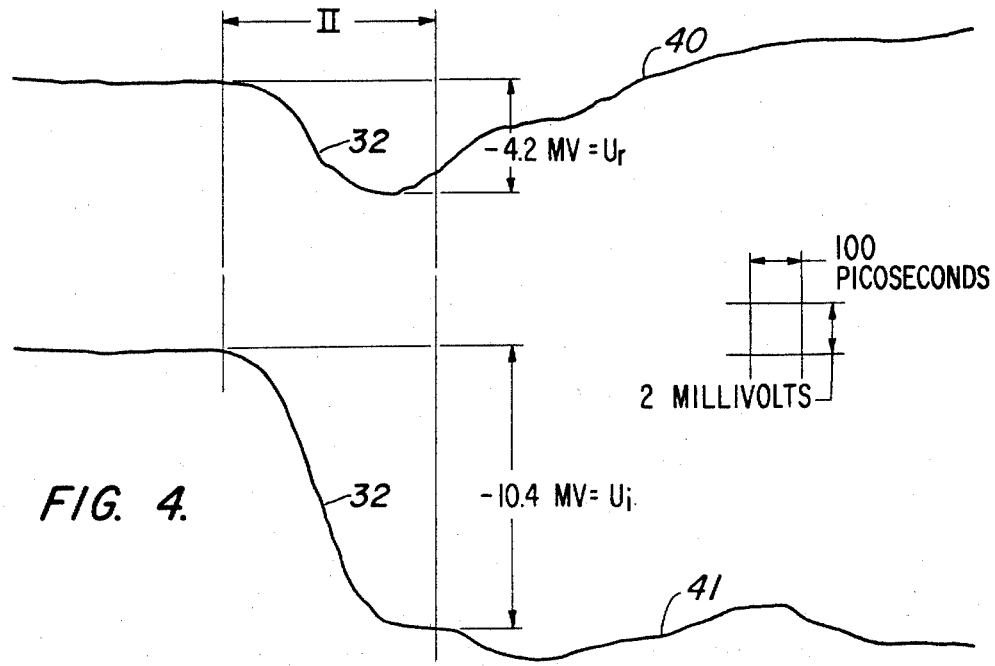
Figure 5:
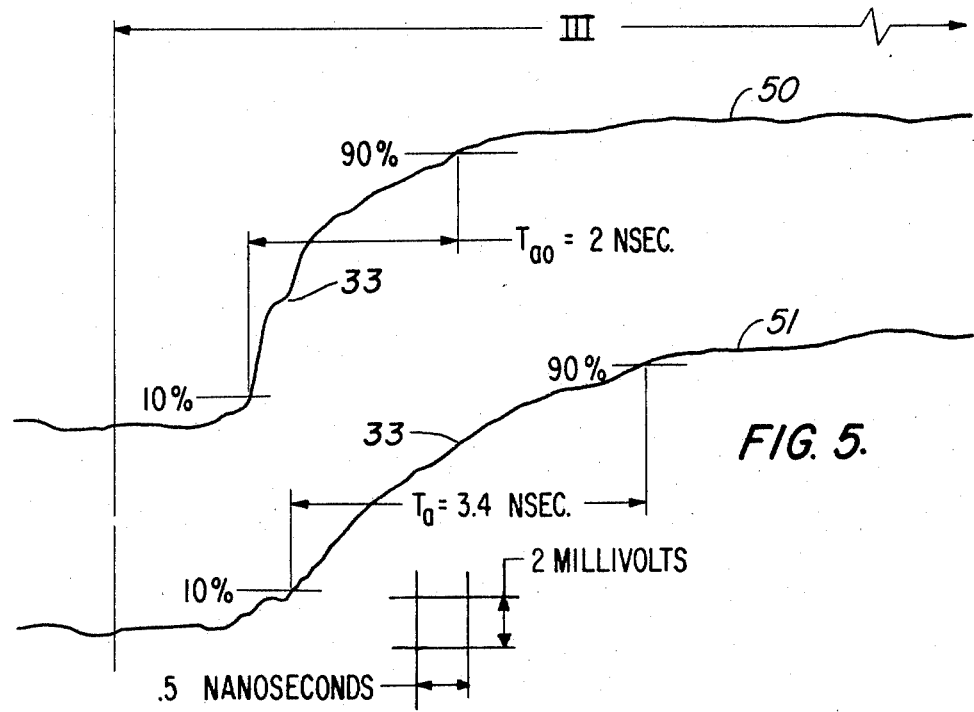
Figures 6A, 6B:
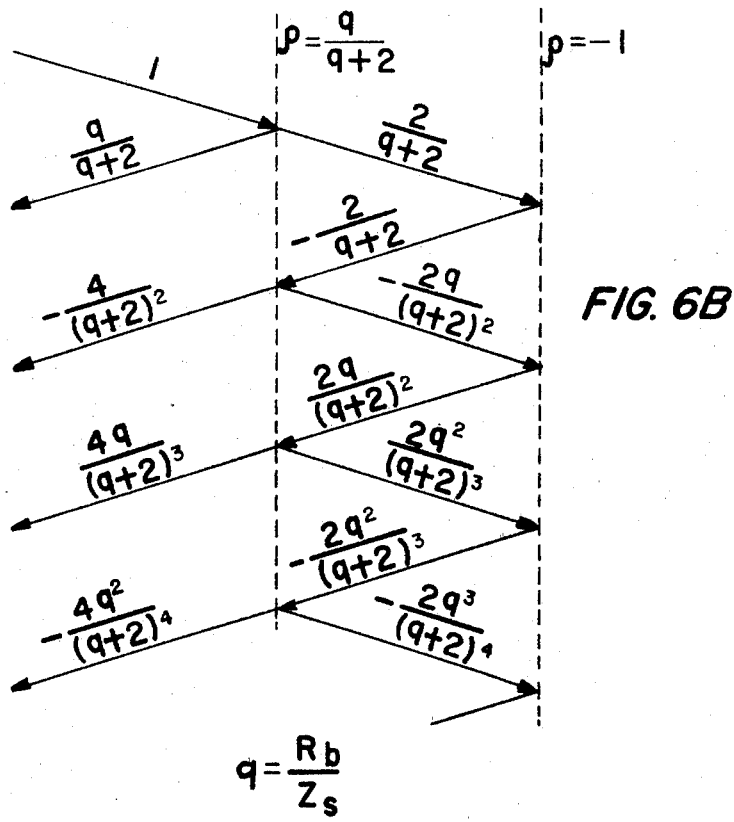
Figure 7:
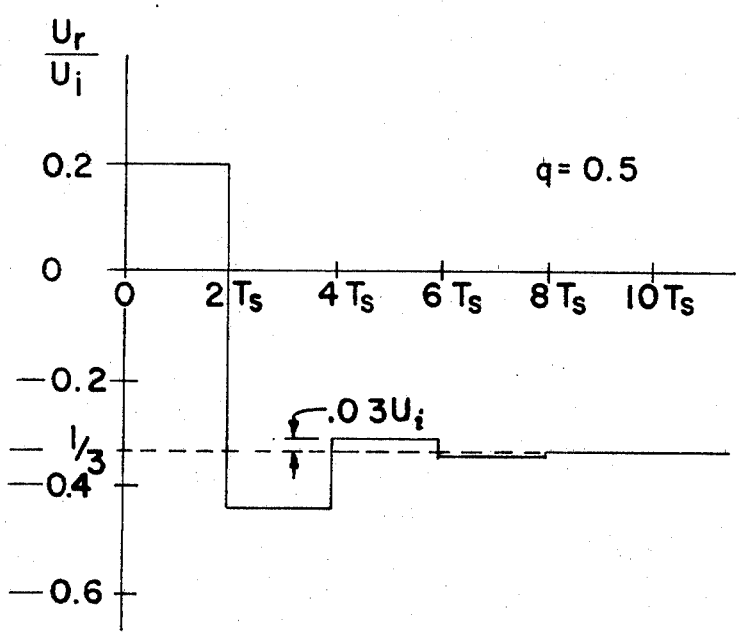

The objects of this invention will become more apparent from the following detailed description taken in conjunction with the accompanying drawings in which FIGURE 1 illustrates the pulse reflectometer test configuration for a transistor;

FIGURE 2 shows the equivalent circuit of the transistor;

FIGURE 3 depicts the idealized pattern of a step-input to a test line and the wave form of the reflection from a transistor termination, including three regions comprising the input step waveform, the reflected step due to base resistance, and the reflected exponential rise due to the collector depletion capacitance and also to the emitter diffusion capacitance, indirectly through its dependence on the $\beta$ cut-off frequency;

FIGURE 4 shows two actual traces obtained with an RCA 2N2857 transistor (developed especially for high-frequency use); the upper trace being an expanded-scale presentation of region II of the curve of FIGURE 3, and the lower trace being a presentation of the reflection pattern of a similar input step waveform when the line is terminated with a short circuit in place of the transistor under test;

FIGURE 5 also presents two actual traces obtained with an RCA 2N2857 transistor. The upper trace of FIGURE 5 is an expanded-scale view of region III of the curve of FIGURE 3, the load resistance in the collector circuit of the transistor being zero; and the lower trace is a similar pattern for the case of a non-zero, finite load resistance in the collector circuit of the transistor;

FIGURE 6 (comprising an upper part referred to below as FIGURE 6A and a lower part referred to below as FIGURE 6B) is a diagrammatic representation of the equivalent circuit of a transistor and of multiple reflections occurring therein; and FIGURE 7 is a diagram of a resultant reflected waveform.

In time domain pulse reflectometry, a coaxial system is terminated with an unknown impedance. A pulse generator, connected to the other end of the coaxial line, then transmits a step of voltage into the line and both the initial step and the reflected wave from the termination are displayed, for example, on the cathode ray tube of a sampling oscilloscope connected to a tap in the line. From the shape and the magnitude of the reflected wave, the nature and value of the unknown impedance can be determined. When a transistor is inserted as the termination of the system the reflected waveform has a number of characteristics from which the values of the various impedances which comprise the transistor equivalent circuit can be calculated, as will be described.

A typical test setup for determination of the parameters of a transistor equivalent circuit is shown in FIGURE 1. Here, a pulse generator 1 is connected by a 50 ohm coaxial line 2 and by a T 3 to a sampling oscilloscope 4, and to another "matching" coaxial line 5 of impedance $Z_0$ connected in turn to the base lead of the transistor under test. An NPN transistor is shown connected in common-emitter configuration, but a PNP transistor or connection in other configurations could be used, with appropriate changes in the equivalent circuit. The pulse generator 1 and oscilloscope 4 are shown as separate instruments though "Time Domain Reflectometers," instruments which combine a pulse generator and a sampling oscilloscope in one package, are available and could be used equally well.

FIGURE 2 shows an equivalent circuit for common-emitter pulse amplifying stages which has been found suitable up to very high frequencies, according to the known art, as long as external stray impedances are kept small or properly terminated. The hybrid-common-emitter circuit of FIGURE 2 is basically Giacoletto's small-signal model (Giacoletto, L. J., "Study of PNP Alloy Junction Transistors From DC Through Medium Frequencies," RCA Review, vol. 15, pp. 506–562, December 1954), including extrinsic elements: the base spreading resistance 20, designated as $R_B$; collector-depletion capacitance 21, hereinafter designated as $C_{CB}$; the reflected emitter resistance 22, designated as $R_{BE}$ hereafter; and the emitter diffusion capacitance 23, designated as $C_{BE}$ hereafter. Current generator 24 is an intrinsic element of the transistor and provides a current $1_B\beta_0{}^1(\omega_1+P)^{-1}$, $1_B$ being the current flowing in resistance $R_{BE}$, $\beta_0$ being the small-signal direct current short circuit common-emitter current gain, $\omega_1$ being the $\beta$ cut-off radian frequency and P being the complex-frequency variable, as is known.

The manner of determination of the parameters of a transistor equivalent circuit such as shown in FIGURE 2 using the test setup illustrated in FIGURE 1, is as follows. A step waveform is generated in pulse generator 1 and fed through a coaxial line 2 to the T 3, from which it goes into the sampling oscilloscope 4 and into the transistor test line 5. The resultant display on the cathode ray tube 10 of oscilloscope 4 is the ideal waveform 31 of the reflection pattern as given in FIGURE 3. In region I of curve 31 there is shown the incoming step 30 from pulse generator 1. The portion of the wave which travels further along test line 5 of impedance $Z_0$ is reflected by the transistor 6 termination, the reflection causing the phenomena at regions II and III of curve 31. It is to be noted that reflections occurring at points other than the location of transistor 6 show up on the display at a different time and therefore do not influence the measurements.

The reflected waveform can be described in the usual fashion by the reflection coefficient:

$$U_R = U_1 \cdot \rho \tag{1}$$

$$\rho = \frac{Z_{IN} - Z_0}{Z_{IN} + Z_0} \tag{2}$$

In these equations $U_1$ is the incident waveform amplitude, $U_R$ is the reflected waveform amplitude, $\rho$ is the reflection coefficient, $Z_{IN}$ is the input impedance into the common-emitter transistor circuit, and $Z_0$ is the line impedance.

The dip 32 in region II of curve 31 is indicative of the magnitude of the base spreading resistance $R_B$ for the case where the emitter 13 is grounded, i.e., resistor 12 is shorted and $R_E = 0$. This can be seen by inspecting FIGURE 2. As the emitter diffusion capacitance, $C_{BE}$ is much large than $C_{CB}$, the collector-depletion capacitance, the former can be considered as a short circuit at high frequencies, under which conditions the equivalent input impedance of transistor 6 consists essentially of resistor 20, i.e. base spreading resistance $R_B$, and two short coaxial lines 25 of impedance $Z_S$—i.e., the distributed impedance of the transistor encapsulation or can—no reflections being caused by the distributed impedance $Z_S$ between base input and base resistor 20 ($R_B$), provided the impedance level of test line 5 is chosen the same as $Z_S$. Next to be considered are reflections generated between the grounded emitter lead and the base resistor. It will be shown below that in all cases the amplitude of these reflections is smaller than 4.3% of the applied signal after a time $4T_S = 80$ picoseconds, where $T_S$ is the time required for the signal to travel from the semiconductor chip to the shorted emitter output.

For region II of curve 31 in FIGURE 3, as stated above, the equivalent circuit of the transistor can be considered as a series connection of a coaxial line of impedance $Z_S$, a resistor $R_B$, and another coaxial line of impedance $Z_S$ terminated with a short circuit, as illustrated in FIGURE 6A. Multiple reflections occur at $R_B$ and at the short circuit as shown in FIGURE 6B, aligned below FIGURE 6A. Assuming an incoming waveform of unit amplitude, the magnitudes of the successive reflections have been calculated and are shown on FIGURE 6B. Note that $Q = R_B/Z_S$.

The reflected waveform appearing at $R_B$ for an incoming step waveform can be constructed from this diagram in the following manner:

The first reflection is generated at $R_B$ at a time $T = 0$ and has an amplitude of $Q/(Q+2)$. The second reflection of magnitude $-4/(Q+2)^2$ occurs at $T = 2T_S$ resulting in a total magnitude of $Q/(Q+2) - 4/(Q+2)^2$, obtained by adding together both reflections. At $T = 4T_S$, The total magnitude amounts to $$Q/(Q+2) - 4/(Q+2)^2 + 4Q/(Q+2)^3$$

As an example, the resultant reflected waveform constructed for $Q = R_B/Z_S = .5$, i.e., $Z_S = 2R_B$, is illustrated in FIGURE 7. As seen from this figure, after a time $T = 4T_S$, the reflected waveform differs from the steady state value by only 3% of U for this value of Q.

To determine the worst case, this deviation must be expressed in terms of Q. For this purpose, note that at $T = \infty$, the total reflected signal has an amplitude of $(R_B - Z_S)/(R_B + Z_S)$, i.e., $(Q-1)/(Q+1)$. The deviation from this value and the value after $T = 4T_S$, hereinafter called $\Delta U_R$, is the found to be $$\Delta U_R = -\frac{2Q^2}{(Q+1)(Q+2)^3}$$

By differentiating this equation with respect to Q, setting the obtained expression equal to zero and solving for Q, one obtains in known fashion the value of Q that produces an extreme in $\Delta U_R$, this value hereinafter being designated as $Q_1$. Performing this process on the foregoing equation yields $$Q_1^2 - Q_1/2 - 2 = 0$$

or $$Q_1 = \frac{1/2 + \sqrt{1/4 + 8}}{2} = 1.69$$

inserting this value of $Q_1$ in $\Delta U_R$, gives $$(\Delta U_R)\ \mathrm{MAX} = \frac{2 \cdot 1.69^2}{(1.69+1)(1.69+2)^3} = .043$$

Thus, for any combinations of $R_B$ and $Z_S$, after a time $T = 4T_S$, the resulting reflection differs from the steady value by less than 4.3% of $U_I$ (the amplitude of the incoming step waveform).

As a practical consideration, in a standard (U.S.) "TO-18" transistor encapsulation, the distance between emitter lead and internal base resistance can be kept as small as 3 mm., resulting in an electrical "length" of about 20 picoseconds. Since a rise time of 200 picoseconds is sufficient to test the fastest transistor available in a TO-18 package, the influence of these reflections can be neglected beyond a time interval of $4T_S = 80$ picoseconds.

Under the above conditions—i.e., high frequencies, test line matched to the transistor encapsulation, and emitter lead shorted as close as possible—the input impedance of the transistor can therefore be assumed to be equal to $R_B$ and the reflection coefficient will then be given by $$\rho = \frac{R_B - Z_0}{R_B + Z_0} \tag{3}$$

Since $\rho$ can be measured from region II of FIGURE 3, solving Equation 3 for $R_B$ yields $$R_B = \left(\frac{1+\rho}{1-\rho}\right) \cdot Z_0 \tag{4}$$

The exponential 33 region III of FIGURE 3 is characteristic for the emitter diffusion capacitance, $C_{BE}$ (actually $\omega_1$), and the collector depletion capacitance $C_{CB}$. The exponential rise time or charge time $T_A$ (measured from 10% to 90% of full amplitude) has been calculated for the condition $Z_0 \approx R_B$ and is $$T_A \approx \sqrt{2\pi} \left[ \frac{R_E + R_B + Z_0}{\omega_1 R} + R_L C_{CB} \right.$$

$$\left. + (R_B + Z_0)(1 + A_0) C_{CB} \right] \tag{5}$$

where $\omega_1$ is the usual $\beta$ cut-off frequency, and $R_E$ is the external emitter resistance (12 in FIGURE 1). Further, $$A_0 = \frac{R_L \beta_0}{R} \quad (6)$$

where $$R = R_{BE} + R_E \beta_0 + R_B \quad (7)$$

$R_L$ is the load resistance 7 connected between the collector 8 of transistor 6 and a source of collector voltage at terminal 9, all other quantities having been identified previously. For $R_L = 0$ and with the assumption that $$C_{CB} \ll 1/\omega_1 R$$

$$T_A \Big|_{R_L=0} = T_{A0} = \sqrt{2\pi} \frac{R_E + R_B + Z_0}{\omega_1 R} \quad (8)$$

Thus, by measuring $T_{A0}$, the $\beta$ cut-off radian frequency, $\omega_1$, can be determined simply from Equation 8 as $$\omega_1 = \sqrt{2\pi} \frac{R_E + R_B + Z_0}{T_{A0} R} \quad (9)$$

The collector-depletion capacitance $C_{CB}$ (21 in FIGURE 2) can next be obtained by making a further measurement of $T_A$ for $R_L \neq 0$. Then, combining Equations 5 and 8

$$C_{CB} = \frac{T_A - T_{A0}}{\sqrt{2\pi}[R_L + (R_B + Z_0)(1 + A_0)]} \quad (10)$$

Equations 4 to 10 provide the tools for determining $R_B$, $\omega_1$, and $C_{CB}$. The other two elements of the equivalent circuit—that is, the base-emitter resistance and capacitance, $R_{BE}$ and $C_{BE}$, respectively, are not determined directly from the reflectometry data. $R_{BE}$ is given by the well-known expression.

$$R_{BE} = \frac{26}{I_C} \cdot \beta_0 \, (\text{OHMS}) \quad (11)$$

where $I_C$ is the collector current (in milliamperes) and $\beta_0$ is the small signal short circuit common-emitter current gain (equal to $I_C/I_B$). $R_{BE}$ can be calculated once the necessary data for $I_C$ and $\beta_0$ are obtained from a low frequency current gain measurement.

$C_{BE}$ can then be calculated from Equations 9 and 11, using the known relation $$C_{BE} = \frac{1}{\omega_1 \cdot R_{BE}} \quad (12)$$

EXAMPLE

The following measurements were carried out on an RCA 2N2857 transistor, a high frequency transistor, using the test setup of FIGURE 1. The pulse generator used was a Hewlett-Packard Model 213B, and the sampling oscilloscope was a Tektronix Model 661, with a Model 4S2 Plug-in, a dual-trace sampling unit with a 0.1 nanosecond rise time. The step waveform generated in the pulse generator 1 normally exhibits an amplitude of approximately 350 millivolts and a rise time of about 100 picoseconds that deteriorates to about 200 picoseconds due to cabling imperfecations. To obtain the true small signal parameters, the test signal was kept as low as a few millivolts by insertion of a 16 db attenuator 11 in the 50-ohm line 2. The accuracy of the measurements could be improved further by applying both positive and negative pulses and taking the mean of both results.

Operating conditions for the 2N2857 as the test transistor 6 were collector current $I_C = 8$ ma.; $U_{CE} = 10$ v., $U_{CE}$ being the voltage drop between the collector 8 and the emitter 13 of transistor 6, and base bias voltage of +1.5 volts at terminal 14, connected through a 10 kiloohm resistor 15 to the base 16 of transistor 6.

From a separate measurement by a known technique such as a short circuit test in the common-emitter configuration, the small signal current gain of the 2N2857 transistor was determined as:

$$\beta_0 = 130$$

Using Equation 11 for the base-emitter resistance $R_{BE}$ (22 in FIGURE 2) there is obtained:

$$R_{BE} = \frac{26 \cdot 130}{8} = 420 \text{ OHMS}$$

Upper trace 40 of FIGURE 4 shows an expanded view of the dip 32 of region II of curve 31 in FIGURE 3 as determined for the 2N2857 under test, the external resistance $R_E$ (12 in FIGURE 1) having been shorted for the measurement, as mentioned previously. The test line chosen had a characteristic impedance of $Z_0 = 95$ ohms to match the TO-18 encapsulation impedance (calculated to be 94 ohms) and corresponding to the impedance $Z_s$ of short coaxial lines (25 in FIGURE 2).

The lower trace 41 is the reflected signal of a short circuit, which condition provides full reflection of the incident step wavefrom. Note that the amplitude of the reflected waveform though equal to that of the incident voltage, is of opposite sign.

Amplitude of reflected step in upper trace 40

$$U_R = -4.2 \text{ Mv.}$$

Amplitude of reflected step in lower trace 41

$$U_I = 10.4 \text{ Mv.}$$

From Equation 1

$$\rho = -\frac{4.2}{10.4} = -.404$$

From Equation 4

$$R_B = 95 \cdot \frac{1 - .404}{1 + .404} = 40.3$$

To use the reflectometric method for determination of $\omega_1$ and $C_{CB}$, one must first satisfy the condition of Equation 5—Namely $Z_0 \approx R_B$. Therefore, for these next measurements, $Z_0$ was chosen to be 50 ohms.

FIGURE 5 contains the reflections of region III which are pertinent to this determination:

Upper trace 50 was made with $Z_0 = 50$ ohms, $R_E = 12$ ohms, and a short circuit as load resistance 7, i.e., $R_L = 0$ ohm. The measured charge time, based on the 10% and 90% points of the exponential portion 33 of trace 50 (the full step of charge voltage being 11.2 millivolts), was $$T_{A0} = 2 \text{ nanoseconds}$$

Applying these values in Equations 7 and 9, there results:

$$R = 420 + 12 \cdot 130 + 40 = 2020 \text{ ohms}$$

and $$\omega_1 = \sqrt{2\pi} \frac{12 + 40 + 50}{2 \cdot 10^{-9}(2020)} = .634 \cdot 10^8$$

further, from Equation 12, $$C_{BE} = \frac{1}{\omega_1 R_{BE}} = \frac{1}{.634 \cdot 10^8 \cdot 420} = 3.75 \cdot 10^{-11}$$

Proceeding next to determination of $C_{CB}$, one turns to lower trace 51 of FIGURE 5 obtained with $R_L = 220$ ohms. The measured charge time, again based on the 10% and 90% points of the exponential portion 33 of trace 51 (the full step of charge voltage being 10.8 millivolts in this instance), was $$T_A = 3.4 \text{ nanoseconds}$$

Applying the above values in Equations 6 and 10, there results:

$$A_0 = \frac{220 \cdot 130}{2020} = 14.2$$

and, finally, $$C_{CB} = \frac{(3.4-2) \cdot 10^{-9}}{\sqrt{2\pi}[220+(40+50)(1+14.2)]} = .35 \cdot 10^{-12}$$

$C_{CB} = .35$ picofarad

Comparison of equivalent circuit network parameters obtained by different measurement methods was not carried out directly, but network values obtained by the technique disclosed were verified by calculating rise times of pulse amplifier stages and measuring them experimentally. This was carried out for all three transistor connections, thereby varying external base, collector, and emitter resistors. Rise time comparisons were in agreement down to about .5 nanoseconds. Below this value (obtainable with the transistor only in stages of less than unity gain), non-agreement of the predicted times with the measured values showed that the approximations made in this equivalent circuit are then no longer valid.

From the foregoing description and with reference to the drawings, it is believed that my method is sufficiently clear and that further details would be superfluous. It is also evident that changes in specific form could be made without departing from the spirit or essential characteristics of the invention. The present embodiment is therefore to be considered as illustrative rather than restrictive, the scope of the invention being defined in the accompanying claims.

I claim:

1. A method of determining the equivalent circuit of an active device by means of time domain pulse reflectometry, said active device having a plurality of leads and being mounted in an encapsulation having a particular impedance, and said reflectometry being a technique utilizing a waveform generator and a sampling oscilloscope to permit monitoring the incident and reflected waves generated when a voltage wave is propagated down a transmission line, characterized in that said method comprises the steps of
   (A) Choosing a transmission line having an impedance substantially equal to said particular encapsulation impedance,
   (B) Connecting a first one of said plurality of leads to the output of said waveform generator by means of said transmission line,
   (C) Connecting the remainder of said plurality of leads to respective reference voltage sources,
   (D) Tapping the transmission line and connecting the same to the input of said sampling oscilloscope,
   (E) Operating the waveform generator to produce a predetermined waveform for transmission to the oscilloscope and said first lead of the active device,
   (F) Measuring on the oscilloscope the waveform reflected by the active device, and
   (G) Calculating from said measurement an impedance characteristic of said equivalent circuit of the active device.

2. The method defined in claim 1 wherein at least one of said remainder of the leads is connected directly to ground.

3. The method defined in claim 1 including the steps of making a further measurement in which the impedance of at least that portion of the transmission line connected to said first one lead is chosen to be approximately equal to an impedance characteristic of said equivalent circuit and calculating a quantity characteristic of said circuit from said two measurements.

4. The method defined in claim 3 wherein said measurements involve determining the rise time of an exponential part of the reflected waveform.

5. The method defined in claim 4 wherein said measurements of rise time are performed on an exponential part of the reflected waveform obtained when a selected one of said remainder of said leads is connected through a load resistance to a reference voltage source, and on an exponential part of the reflected waveform obtained when said selected one lead is connected directly to said reference voltage source and said quantities calculated from said measurements are impedances characteristic of said circuit.

6. The method defined in claim 4, wherein the active device exhibits gain and has an impedance related thereto, and further including the step of combining said quantity determined from said rise time measurement with said gain-related impedance, to thereby obtain another impedance characteristic, of said equivalent circuit.

7. The method of determining the equivalent circuit of an active device by means of time domain pulse reflectometry, as defined in claim 1, wherein said active device is a transistor having first, second, and third leads.

8. The method defined in claim 7, wherein said second lead of the transistor is connected directly to ground and said impedance characteristic determined by the method is associated with an internal area of the transistor connected to said first lead.

9. The method defined by claim 8, wherein said transistor is connected in common-emitter configuration, said first lead being the base lead of the transistor and said second lead being the emitter lead, and said impedance characteristic being associated with the base region of the transistor.

10. The method defined in claim 9, wherein said impedance characteristic associated with the base region is the base spreading resistance.

11. A method of determining the equivalent circuit of a transistor by means of time domain reflectometry, said transistor having three leads and being mounted in an encapsulation having a particular impedance, and said reflectometry being a technique utilizing a waveform generator and a sampling oscilloscope to permit monitoring the incident and reflected waves generated when a voltage wave is propagated down a transmission line, comprising the steps of:
   (A) Making a first group of reflectometric measurements while using for said transmission line a first coaxial line having an impedance equal to said particular encapsulation impedance, said coaxial line being terminated once with said transistor and again with a short circuit;
   (B) Obtaining a reflected waveform with each termination; and
   (C) Calculating an impedance characteristic of the equivalent circuit of said transistor from measurements on the reflected waveforms; and then
   (D) Making a second group of reflectometric measurements while using for said transmission line a second coaxial line having an impedance equal to said calculated impedance, said second coaxial line being terminated with said transistor, at least one of the leads of said transistor being connected to a source of reference voltage once through a load resistance and again with a direct connection;
   (E) Obtaining a reflected waveform with each lead connection; and finally
   (F) Calculating the remaining equivalent circuit characteristics from measurements on the reflected waveforms of said second group and measurement of the small signal current gain and collector current of the transistor.

12. The method defined in claim 11, wherein said transistor is connected in common-emitter configuration, said first lead being the base lead of the transistor and said second lead being the emitter lead, and said impedance characteristic determined in said first group of measurements being the base spreading resistance.

13. The method defined in claim 11, wherein the impedance characteristics determined in said second group of measurements comprise the $\beta$ cut-off frequency and the collector-depletion capacitance.

14. The method defined in claim 13, wherein the impedance characteristics determined in said second group of measurements include the base-emitter capacitance.

References Cited

Electronics, "Testing Microwave Transmission Lines Using The Sampling Oscilloscope" (H. Halverson), June 30, 1961, pp. 86–88.

ARCHIE R. BORCHELT, Primary Examiner

E. L. STOLARUN, Assistant Examiner

U.S. Cl. X.R.

324—58